United States Patent [19]

Bagnall

[11] 3,855,048

[45] Dec. 17, 1974

[54] FOAM LAMINATES

[75] Inventor: Raymond Bagnall, Cheadle, England

[73] Assignee: Caligen Foam Limited, Lancashire, England

[22] Filed: Jan. 5, 1973

[21] Appl. No.: 321,172

[30] Foreign Application Priority Data
Jan. 19, 1972  Great Britain...................... 2463/72

[52] U.S. Cl.................... 161/159, 161/92, 161/190, 156/82
[51] Int. Cl...................... B32b 31/20, B32b 31/26
[58] Field of Search ................. 156/77, 78, 82, 497; 161/159, 92, 190

[56] References Cited
UNITED STATES PATENTS

| | | | |
|---|---|---|---|
| 3,318,744 | 5/1967 | Hurley | 156/82 |
| 3,368,932 | 2/1968 | Weill et al. | 156/82 |
| 3,454,449 | 7/1969 | King | 156/82 |

*Primary Examiner*—William J. Van Balen
*Attorney, Agent, or Firm*—Breitenfeld & Levine

[57] ABSTRACT

A process of laminating textile fabrics to opposite sides of polyurethane foam in which the lamination is effected by flame bonding under such conditions that the temperature to which the foam is raised at one side is different from that to which it is raised at the other side.

9 Claims, No Drawings

FOAM LAMINATES

The invention relates to laminates of textile fabrics, for example any type of cloth such as knitted, woven or fibre bonded fabrics, with polyurethane foam, in which a sheet of foam is laminated on both sides to fabrics and so forms the middle layer of a sandwich. The laminates of the present invention are those made by flame bonding.

Such laminates have many uses but are especially valuable in the manufacture of clothing and for this purpose a combination of good bond strength, especially in the wet state, good flexibility and good draping properties are especially desirable.

It is generally accepted that if the temperature of the foam during flame bonding is high and if the pressure used during the lamination process is high the bond strength of the final laminate is improved but the softness, flexibility and draping qualities are simultaneously reduced.

We have now found that laminates of good wet and dry bond strengths combined with good drape and flexibility can be obtained if the temperature of the foam during flame lamination is high on one side of the sheet of foam compared to the other side. Particularly satisfactory results are obtained using foams having a large cell structure (that is less than 40 cells per linear inch).

According to the invention there is provided a process of laminating textile fabrics to opposite sides of polyurethane foam in which the lamination is effected by flame bonding under such conditions that the temperature to which the foam is raised at one side is different from that to which it is raised at the other side. Preferably one side is raised to at least 400°C. and the other side to not more than 360°C. and preferably not more than 340°C. Lamination of the two sides will generally be effected in separate stages.

We have further found that the improvement in softness and draping qualities of foam laminates made according to the invention, is especially marked if, during each of the two stages of the flame laminating process, the "gap setting" of the nip rollers, which apply pressure to the heated foam and the fabric or fabrics, is carefully controlled. The necessary setting will vary with a number of factors, but settings between 0.6 and 0.9, and preferably between 0.75 and 0.8, have been found to produce good results.

By "gap setting" we mean the relationship between the distance apart of the nip rollers, and the composite thickness of the fabric or fabrics and the foam. Thus the gap setting during the first stage of flame lamination when the first fabric is bonded to the foam, may be 0.75 ($dl + dfo$), and during the second stage of flame lamination when the second fabric is bonded to the foam and fabric, may be 0.75 ($dl + dfo + dfa$), where dl is the thickness of the lining fabric, dfa is the thickness of the face fabric, and dfo is the thickness of the foam less the thickness of foam burnt off the face or faces of the foam during heating.

In a preferred method of carrying out the ivention a sandwich laminate is made by first laminating a lining fabric to one side of a sheet of foam having a large cell structure. The gap setting of the nip rollers during this lamination is between 0.6 and 0.9, and the conditions of heating are selected so that the temperature of the foam is less than 340°C. and, together with the pressure, is sufficient to effect an adequate bond for the material to be further treated. The bonded foam and fabric may then be laminated on the opposite side of the foam to a face fabric, the gap setting of the nip rollers being also between 0.6 and 0.9 and the conditions of heating selected so that the temperature of the foam is more than 400°C.

The invention is more particularly described in the following Examples which are given by way of illustration only and are not to be regarded as limitative.

EXAMPLE 1

A. a polyester urethane foam 1.25 mm thickness having 55–60 cells/linear inch and a density of 1.8 lbs./cu.ft. was bonded to a single jersey face fabric 0.030 inch thick and to a knitted acetate lining fabric, 0.012 inch thick, by the flame laminating process. Normal commercial processing techniques were used. Equal flame mixture settings of 4.5 (11.25 volume percent gas/air) were used for each of the two burners in a single pass laminating machine, the machine being run at 45 linear yards/minute. On both sides the temperature of the foam was 370°C.

The nip rollers were set 0.021 inch apart (gap setting 0.40) to bond the lining fabric, and 0.0225 inch apart (gap setting 0.30) to bond the face fabric.

The following bond strength measurements were obtained from this laminate.

| Air dry | 17.3 oz/inch |
|---|---|
| Wet soap | 4.8 oz/inch |

These tests were conducted by the methods described for peel bond strength measurement in BS 4614 part 1, and British Standard 903 (A12).

The drape coefficients obtained were:

| Face up | 47% |
|---|---|
| Face down | 36% |

These drape coefficients were measured on the Wilmslow, drapemeter, an instrument supplied by Web Processing Limited of Wimslow, England for measuring the extent to which a fabric will deform when allowed to hang under its own weight, measurements being based on the deformation by gravity of an initially horizontal annular ring of fabric. Good drape properties are indicated by a low drape coefficient. B. Fabrics similar to those described in Part A, were laminated by the process of the present invention using a similar machine to that used in Part A but using a polyester urethane foam having a thickness of 1.25 mm. and a density of 1.6 lbs./cu.ft. having 38 cells/linear inch.

To bond the lining fabric the flame burners were adjusted to give a very weak flame, having a gas/air mixture setting of 3 (15 volume percent gas/air), and the temperature of the foam was 340°C. To bond the face fabric the flame burners were adjusted to a mixture setting of 7 (5 volume percent gas/air) and the speed of the fabric was 38 yards/minute and the temperature of the foam 400°C.

The nip rollers for both of the two nips were set 0.046 inch apart (gap setting of 0.85 for the lining and gap setting of 0.65 for the face fabric).

The following bond strength measurements were obtained from this laminate by the same test methods used in Part A.

| | |
|---|---|
| Air dry | 26.2 oz/inch |
| Wet soap | 10.5 oz/inch |

The drape coefficients obtained by the Cusick drapemeter were:

| | |
|---|---|
| Face up | 43% |
| Face down | 34% |

EXAMPLE II

A polyester urethane foam 0.060 inch thick having a density of 1.6 lbs./cu.ft. with 38 cells/linear inch was bonded to a knitted acetate lining fabric 0.12 inch thick and to a single jersey face fabric made from acrylic fibre 0.023 inch thick. A single pass flame laminating machine was used to carry out the operation.

The flame burners for the lining fabric side were adjusted to give a very weak flame having a gas/air mixture setting of 3 (15 volume percent gas/air) corresponding to a foam surface temperature at the running speed of 38 yards/minute, of about 340°C. A nip setting of 0.039 inch was used at the lining side (gap setting of 0.65). The foam on the face fabric side was heated to a surface temperature of 400°C. by the use of a fierce flame having a gas/air mixture setting of 7 (5 volume percent gas/air) and set at a distance from the foam of 39mm. A nip setting between the rollers of 0.034 inch was used (gap setting 0.65).

A consecutive example using the same fabrics but using a polyester urethane foam of 35 cells/linear inch but otherwise identical was run under similar conditions. The following results for the bond strength were obtained.

| | 38 cells/inch | 35 cells/inch |
|---|---|---|
| Air dry | 24.8 oz/inch | 28.8 oz/inch |
| Wet soap | 8.8 oz/inch | 15.2 oz/inch |

Measurements of the drape and handle qualities of the two sets of samples as measured by the Cusick drapemeter showed the following figures

| | 38 cells/inch | 35 cells/inch |
|---|---|---|
| Face up | 40.8% | 42% |
| Face down | 37.7% | 35.0% |

Various modifications may be made without departing from the invention and though best results are achieved with foams having a large cell structure it is believed that improvements will also be obtainable with foams having a small cell structure. The invention is also applicable to laminates having more than three layers of fabric and foam.

I claim:

1. A process of laminating cloth to opposite sides of polyurethane foam, comprising the steps of:
   a. providing a sheet of polyurethane foam,
   b. heating one side of the foam sheet to at least 400°C,
   c. pressing a cloth layer against said one side to laminate the cloth and foam,
   d. heating the other side of the foam sheet to no higher than 360°C and
   e. pressing another cloth layer against said other side of the foam to laminate the another cloth layer and the foam,
   thereby producing a laminate comprising the polyurethane foam sheet sandwiched between the two cloth layers.

2. A process according to claim 1 wherein the other side of the foam sheet is heated to no higher than 340°C.

3. A process according to claim 1 wherein the pressing of steps (c) and (e) is performed by passing the cloth and foam between nip rollers, the gap between the rollers at their point of closest spacing being between 0.6 and 0.9 times the combined thickness of cloth and foam entering between the rollers.

4. A process according to claim 3 wherein the gap between the rollers at their point of closest spacing is between 0.75 and 0.8 times the combined thickness of cloth and foam entering between the rollers.

5. A process according to claim 1 wherein the cloth layers are applied sequentially to the opposite sides of the foam.

6. A process according to claim 1 wherein the foam has a cell structure having fewer than 40 cells per linear inch.

7. A process of laminating cloth to opposite sides of polyurethane foam, comprising the steps of:
   a. providing a sheet of polyurethane foam having a cell structure with fewer than 40 cells per linear inch,
   b. heating one side of the foam sheet to a temperature of at least 400°C. by means of a flame,
   c. pressing a cloth layer against said one side to laminate the cloth and foam,
   d. thereafter heating the other side of the foam sheet to a temperature no higher than 340°C. by means of a flame, and
   e. then pressing another cloth layer against said other side of the foam to laminate the another cloth layer and the foam.

8. A laminated structure produced by the process of claim 1.

9. A laminated structure produced by the process of claim 7.

* * * * *